March 1, 1938.  R. H. GODDARD  2,109,529
REENFORCED CONSTRUCTION FOR LIGHT HOLLOW MEMBERS
Filed Dec. 21, 1936  3 Sheets-Sheet 1
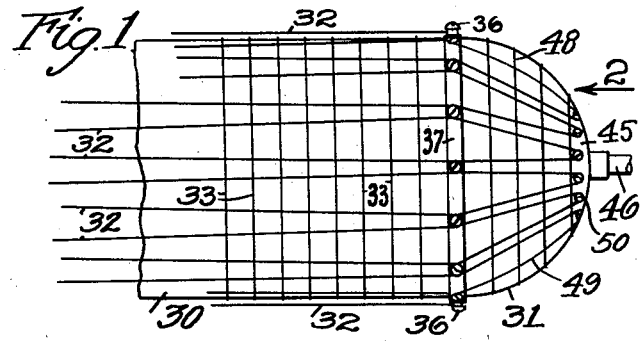
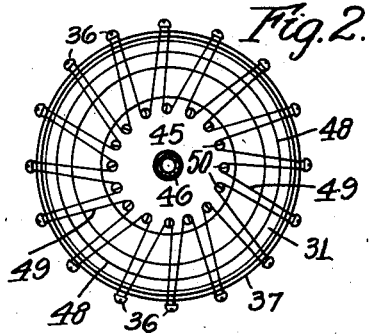
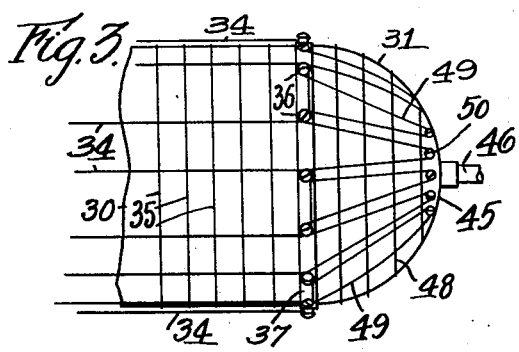
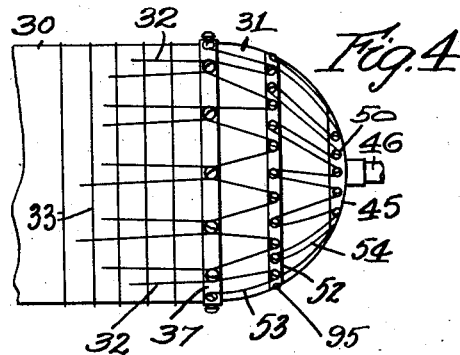
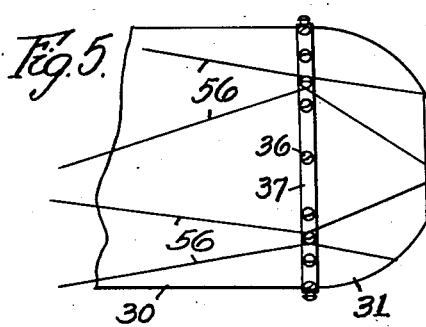
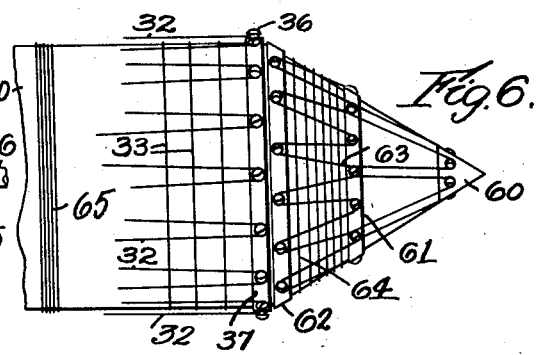
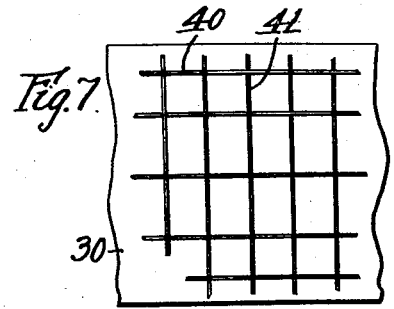
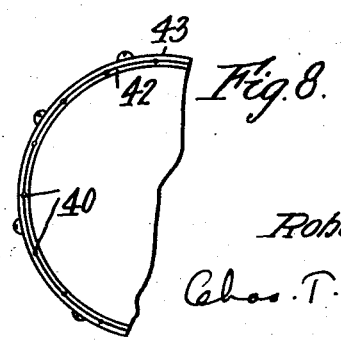
Inventor
Robert H. Goddard
By attorney
Chas. T. Hawley March 1, 1938.  R. H. GODDARD  2,109,529
REENFORCED CONSTRUCTION FOR LIGHT HOLLOW MEMBERS
Filed Dec. 21, 1936  3 Sheets-Sheet 2
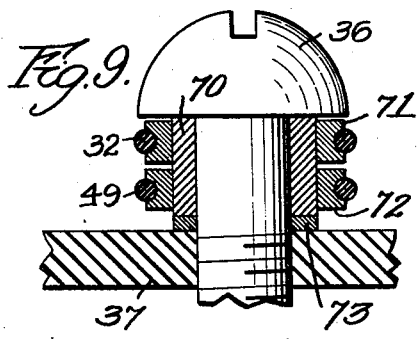
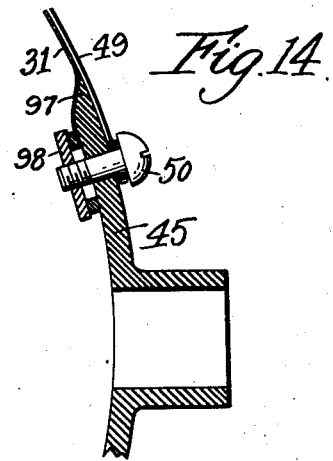
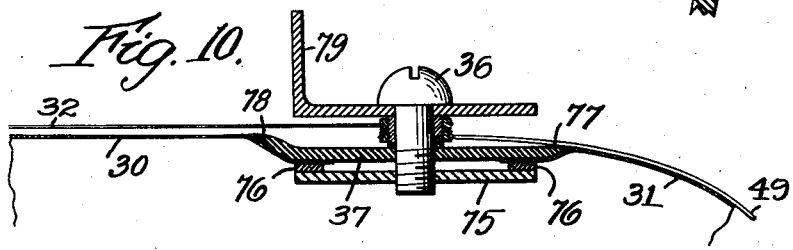
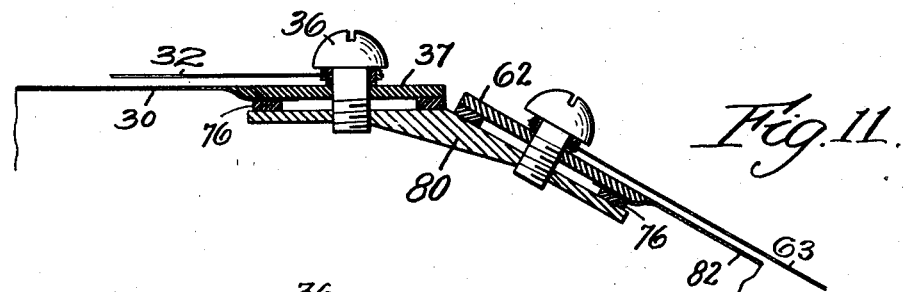
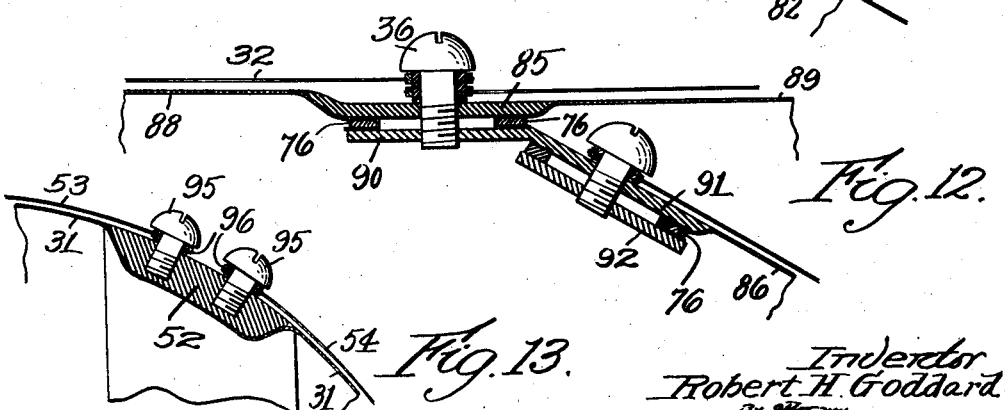
Inventor
Robert H. Goddard
By Chas. T. Hawley attorney March 1, 1938. R. H. GODDARD 2,109,529
REENFORCED CONSTRUCTION FOR LIGHT HOLLOW MEMBERS
Filed Dec. 21, 1936 3 Sheets-Sheet 3
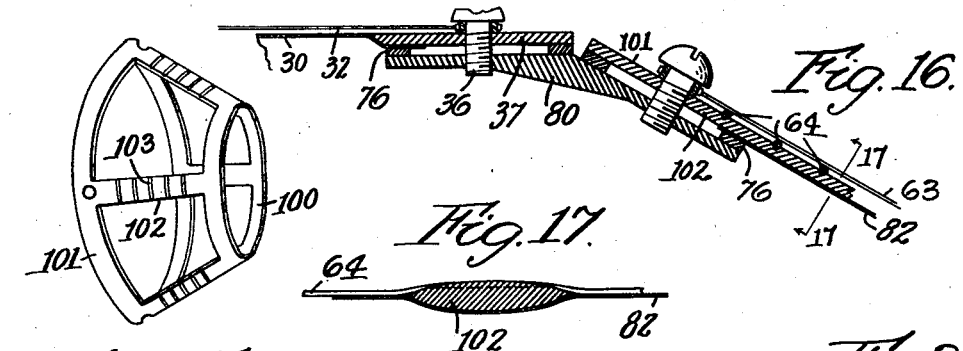
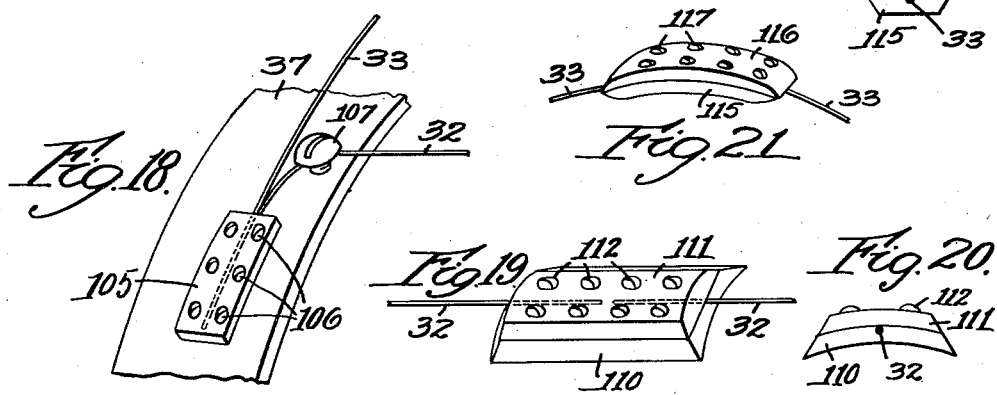
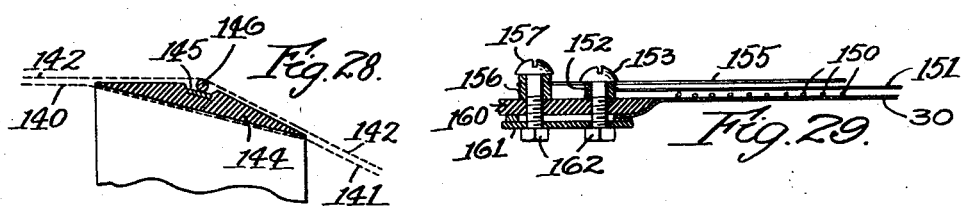
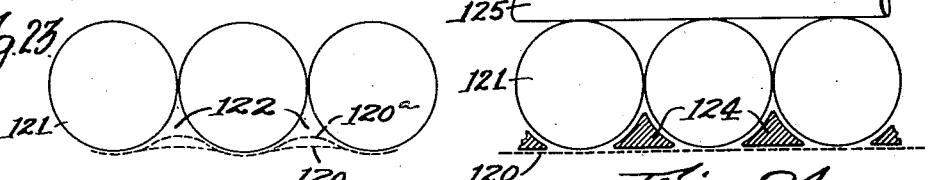
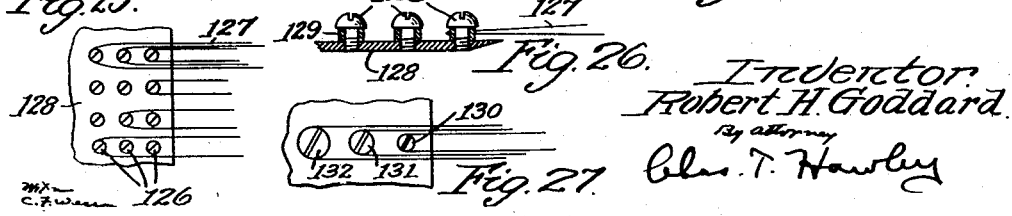
Inventor
Robert H. Goddard
By attorney Patented Mar. 1, 1938

2,109,529

UNITED STATES PATENT OFFICE 2,109,529

REENFORCED CONSTRUCTION FOR LIGHT HOLLOW MEMBERS

Robert H. Goddard, Roswell, N. Mex.

Application December 21, 1936, Serial No. 116,935

26 Claims. (Cl. 244—117)

This invention relates to the construction of light hollow members subjected to substantial internal pressure, such as frame members, struts, tanks or conduits for use in aircraft, including rockets and rocket planes.

It is the general object of my invention to provide a construction by which a maximum strength is attained in light hollow members, with a minimum weight of material.

In the attainment of this object, I utilize the high tensional strength of small wires, such as fine steel music wires, and I use this wire in a novel manner to reenforce container walls formed of very thin sheet metal or foil. Such fine wires may have a tensile strength as high as 400,000 lbs. per square inch.

My invention relates particularly to arrangements and combinations of parts by which these two forms of material may be effectively combined in such manner as to fully utilize the diverse but desirable qualities of the two materials to the best advantage.

My invention further relates to certain features of construction which will be hereinafter described and more particularly pointed out in the appended claims.

Preferred forms of the invention are shown in the drawings, in which

Fig. 1 is a plan view of one end portion of a light tank embodying my improvements;

Fig. 2 is an end view thereof, looking in the direction of the arrow 2 in Fig. 1;

Fig. 3 is a view similar to Fig. 1 but showing a slightly modified construction;

Fig. 4 is also similar to Fig. 1 but shows an additional modification;

Fig. 5 is a plan view of a portion of a tank provided with cross bracing to resist torsional strains;

Fig. 6 is a view similar to Figs. 1, 3 and 4 but showing a portion of a tank having a conical end portion;

Fig. 7 is a detail view showing the interlacing of longitudinal and circumferential windings;

Fig. 8 is a partial end elevation of modified means for securing the ends of the longitudinal reenforcing wires;

Fig. 9 is an enlarged sectional view showing improved means for anchoring loops of longitudinal wires;

Fig. 10 is a detail sectional view showing a device for connecting the cylindrical and end portions of a tank such as is shown in Figs. 1 to 5;

Fig. 11 is a similar view of a device for connecting the cylindrical and end portions of a tank such as is shown in Fig. 6;

Fig. 12 is a sectional view, showing means for securing an internal partition to the cylindrical wall of a tank;

Fig. 13 is a sectional view showing the preferred form of an intermediate ring for use in the end section of a tank;

Fig. 14 is a sectional view showing means for connecting reenforcing wires and thin sheet metal to the end disc of a tank;

Fig. 15 is a perspective view of a modified frame structure for a tank having a conical end portion;

Fig. 16 is an enlarged view showing a portion of this modified frame structure in section;

Fig. 17 is a transverse sectional view, taken along the line 17—17 in Fig. 16;

Fig. 18 is a perspective view showing means for securing the ends of wires to a supporting ring;

Fig. 19 is a perspective view showing means for clamping together adjacent ends of longitudinal wires;

Fig. 20 is an end elevation of the clamping means shown in Fig. 19;

Fig. 21 is a perspective view of a clamping means for joining adjacent ends of circumferential wires;

Fig. 22 is an end view of the clamping means shown in Fig. 21;

Fig. 23 is a detail view to be described;

Fig. 24 is a sectional view showing means for remedying the defect indicated in Fig. 23;

Fig. 25 is a plan view of a modified arrangement for securing longitudinal wires to circumferential rings;

Fig. 26 is a sectional side elevation of the structure shown in Fig. 25;

Fig. 27 is a detail plan view showing a modification of the structure shown in Fig. 25;

Fig. 28 is a sectional view of a modified device for joining the cylindrical and conical end portions of a tank; and Fig. 29 is a detail sectional side elevation to be described.

Referring to Sheet 1 of the drawings, I have shown my reenforced construction embodied in a tank having a cylindrical body portion 30 and having end portions which may be semispherical as shown at 31 in Fig. 1 or conical as shown in Fig. 6. The walls and ends of these tanks are formed of very thin sheet metal or foil, and the necessary joints are preferably welded. These tanks are designed for resisting heavy internal pressure and may be used as containers for compressed air or for other gases under pressure.

In order to provide resistance to this heavy internal pressure, I reenforce the body portion 30 (Fig. 1) by a plurality of longitudinally extending wires 32 and a plurality of circumferentially extending wires 33. The longitudinal and circumferential wires are preferably proportioned in number to correspond to the stresses to be resisted.

In Fig. 1, for instance, the longitudinal wires 32 have about the same average spacing as the circumferential wires 33, while in Fig. 3 the spacing of the longitudinal wires 34 is substantially twice that of the circumferential wires 35. Any other desired proportions may be adopted to suit conditions which may arise.

The longitudinal wires 32 are preferably looped back and forth around screws 36 (Fig. 1) mounted in a supporting ring or plate 37. If the longitudinal wires are quite closely spaced as in Fig. 1, the wires may be looped around single screws as shown, but if the longitudinal wires are more widely spaced apart, as indicated in Fig. 3, each loop of the wires 34 will preferably be passed around two screws 36 in the supporting ring 37. With this latter construction, the longitudinal wires are parallel and the spacing is uniform throughout the length of the tank.

An alternative arrangement of longitudinal and circumferential wires is shown in Fig. 7, in which the longitudinal wires 40 are interwoven with the circumferential wires 41. In this case, the longitudinal wires 40 may be formed in separate lengths and the ends of the wires 40 may be clamped between inner and outer end rings 42 and 43 (Fig. 8).

Each end of the tank is preferably provided with a disc or plate 45, in one of which a pipe 46 may be inserted for filling or emptying the tank. A suitable valve (not shown) may be provided in the pipe 46, to prevent escape of air or gas under pressure.

The end portion 31 of the tank shown in Figs. 1 and 2 is preferably reenforced in a manner similar to the cylindrical portion 30. In Figs. 1, 2 and 3 I have shown a plurality of spaced circumferential windings 48 and a series of longitudinally disposed wires 49 looped around screws 50 on the end plate or disc 45 and around the screws 36 in the ring 37 previously identified. With this construction, the outward pressure on the semi-spherical end of the tank is also effectively resisted.

Obviously as the wires 49 approach the end disc 45, they are more closely spaced than they are adjacent the ring 37, so that a disproportionate weight of the wires 49 is used adjacent the end disc 45.

In order to reduce the amount of wire adjacent the end disc, the construction shown in Fig. 4 may be adopted, in which an intermediate ring 52 is provided. One set of longitudinal wires 53 is provided between the ring 37 and the ring 52, and a second set of wires 54 is provided between the ring 52 and the end disc 45. By this arrangement the spacing of the wires may be made substantially more uniform.

The longitudinal and circumferential wires above described afford effective reenforcement of the tank against bursting by internal pressure exerted on the thin sheet metal walls of the body 30 and ends 31. These longitudinal and circumferential wires do not, however, effectively resist torsional strain on the tank, and the tank may be easily disrupted by any force tending to twist one end of the tank relative to the other about its longitudinal axis.

In order to resist such torsional strain, I preferably provide cross wires as indicated at 56 in Fig. 5, which wires make substantial angles to the axis of the tank and effectively resist torsional strain. A suitable combination of longitudinal, circumferential and cross wires in selected proportions very effectively reenforces the thin sheet metal or foil of the tank walls. I am thus able to construct a tank of extremely light weight but which nevertheless very strongly resists internal pressure or torsional strains at all points and with a minimum weight of material.

Instead of making the end of the tank semi-spherical, as shown in Figs. 1 to 5, a conical construction may be provided as indicated in Fig. 6. In this case a conical cap 60 takes the place of the end disc 45 previously described, and the supporting rings 61 and 62 are of frustro-conical shape. The ring 62 is additional to the ring 37 previously described and its use is desirable on account of the sharp inclination of the longitudinal wires 63.

Circumferential wires 64 are provided between the rings 61 and 62 and are shown in Fig. 6 as quite closely spaced to more firmly resist outward pressure in this portion of the tank. Obviously, additional circumferential wires may be provided between the cap 60 and ring 61 if found desirable.

I have also found it desirable in certain cases to provide a plurality of closely spaced circumferential wires 65 (Fig. 6) at one or more points in the length of the body 30, while in the remaining portions of the body the normally spaced circumferential wires 35 may be used.

Having described the general construction by which the advantages of my invention may be attained, I will now describe certain details of construction which have been found useful and very desirable.

In order to equally distribute the strain on the longitudinal wires, it is desirable that the wires should be freely movable around the screws about which they are looped. To accomplish this purpose, I provide the construction shown in Fig. 9, in which I have shown one of the screws 36 (Fig. 1) and a portion of a ring 37, both on an enlarged scale.

A sleeve 70 is provided for the screw 36 and a pair of grooved rings 71 and 72 are freely rotatable on the sleeve 70. A packing ring 73 is inserted between the end of the sleeve 70 and the supporting ring 37, and the sleeve 70 is forced firmly against the packing ring 73 by tightening the screw 36, thus preventing leakage of compressed air or gas around the screw 36.

With this construction, the longitudinal body wires, as 32 in Fig. 1, may be guided around the upper grooved ring 71 and the longitudinal end wires 49 may be guided around the lower grooved ring 72. It is desirable that the wires on the two grooved rings should pull in opposite directions, thus substantially equalizing the bending strain on the screws 36. The rings 71 and 72 are to be made as narrow as possible so that the wires may be positioned closely adjacent the thin metal walls 30 and 31.

The manner in which these thin metal walls are secured to the rings 37 is very important, and a preferred construction for this purpose is shown in Fig. 10. The edges of the thin metal body 30 and the end portion 31 are clamped to the under side of the ring 37 by an inner clamping ring 75 and packing rings 76. The screws 36 extend loosely through the plate 37 and are threaded into the inner ring 75.

When the screws are tightened, the packing rings 76 are forced against the edges of the body 30 and end 31 and hold them firmly clamped against the inner face of the ring or plate 37. The packing rings should be much narrower than the ring 37, so that an effective compressive force may be applied therethrough.

It is desirable that the edge 77 of the ring 37 be chamfered or beveled as indicated in Fig. 10, so that the thin sheet metal end 31 will be supported by the ring or plate to a point closely adjacent its engagement with the wire 49.

Similarly the opposite edge of the ring or plate 37 should be bent outward and also chamfered or beveled, as indicated at 78, so that the thin sheet metal body 30 may be supported to a point closely adjacent the longitudinal wires 32. Supporting means for the tank as a whole, such as the flanged member 79, may also be secured by the screws 36.

This matter of supporting the thin sheet metal or foil by beveled and chamfered edges to points closely adjacent the reenforcing wires is extremely important, as otherwise the thin metal will readily break or tear along the edge of the ring or plate 37 where it does not engage with and is not reenforced by the longitudinal wires.

In Fig. 11 I have indicated a preferred construction where a ring 37 for the body portion and a ring 62 (Fig. 6) for the conical end portion are both used. I then provide a double inner ring 80 having a cylindrical portion and a conical portion as shown in Fig. 11, and I clamp the ring 37 and body portion 30 to the cylindrical portion of the inner ring 80, while the ring 62 and conical end portion 82 are clamped to the conical portion of the inner ring 80. The outer edges of the rings 37 and 62 will be chamfered or beveled as in the construction shown in Fig. 10 and for the same purpose.

With long tanks it may be desirable to provide rings 85 at intermediate portions and to provide intermediate partitions 86. To effect this arrangement, I prefer to use the construction shown in Fig. 12, in which the ring or plate 85 corresponds to the ring 37 shown in Fig. 10 and connects the edges of two body portions 88 and 89. The inner clamping plate or ring 90, however, is provided with a conical extension 91, the construction of which is similar to the ring 62 shown in Fig. 11. The thin partition wall 86 is clamped to this conical extension 91 by an inner clamping ring or plate 92. The edge of the extension 91 will be chamfered or beveled as previously described.

In Fig. 12 I have also shown the thin sheet metal wall portions 86, 88 and 89 as wrapped about the packing rings 76 instead of being engaged at one side only by the ring as shown in Figs. 10 and 11. With this construction the edges of the thin metal walls are held firmly confined. The packing rings may be secured to the edges of the sheets before assembly if desired, in which case assembly of the parts is facilitated. This arrangement can also be used in the construction shown in Figs. 10 and 11 if desired.

In Fig. 13 I have shown the preferred construction to be used for intermediate rings, such as 52 (Fig. 4), when the semi-spherical end wall 31 is to be continuous inside of the ring. Both outer edges of the ring 52 are chamfered or beveled as previously described so as to support the thin wall 31 to points closely adjacent to the reenforcing wires 53 and 54. The inner edges of the ring 52 are also carefully rounded to avoid sharp corners, and the tapped holes for the screws 95 do not extend entirely through the ring 52, so that the screws cannot project inside the ring and puncture the thin wall 31. Single grooved rings 96 are preferably provided on the screws 95 to receive the loops of the longitudinal wires 53 and 54.

A preferred method of securing the end wall 31 and longitudinal end wires 49 to the end disc 45 is shown in Fig. 14, the construction being similar to that shown in Fig. 10, or Fig. 12, with the outer edge of the end disc 45 chamfered or beveled as indicated at 97, and with the screws 50 extending freely through the disc 45 and threaded into a conical clamping ring 98.

If the circumferential windings 64 (Fig. 6) are spaced apart and have a tendency to slip axially a frame structure as shown in Figs. 15 to 17 may be utilized. This structure comprises rings 100 and 101 corresponding to the rings 61 and 62 in Fig. 6 and joined together by connecting bars 102 having spaced grooves or notches 103 to receive and retain the circumferential windings 64. The ring portion 101 may be secured to an inner ring 80, to which is also secured the supporting ring 37 and cylindrical wall 30, all as shown in Fig. 16 and similar to the construction shown in Fig. 11.

The connecting bars 102 are preferably of the cross section shown in Fig. 17, with the side edges beveled from both sides and carefully smoothed so that the sheet 82 may be continuously supported, either by the bars 102 or by the reenforcing circumferential wires 64.

Whenever it is necessary to anchor the end of a longitudinal wire 32 or a circumferential wire 33 to a supporting ring or plate 37, I provide a clamping plate as shown at 105 in Fig. 18. This plate is provided with a plurality of screws 106 threaded into the ring 37 and by which the plate may be securely clamped on the ends of the wires inserted thereunder. The end of a circumferential wire 33 may be entered directly under the plate but the end of a longitudinal wire as 32 is preferably drawn around a guide screw as 107, so that the plate 105 may be of narrow width axially of the ring 37.

If a longitudinal wire as 32 requires splicing, I provide a splicing clamp 110 (Figs. 19 and 20) having a cap 111 secured thereto by screws 112. This clamp is concave transversely on its under face to correspond to the curvature of the circumferential windings on which it rests. The ends and sides of the block 110 are chamfered or beveled on the upper side as indicated in Fig. 19, so that the longitudinal wire to be spliced will be as nearly as possible in contact with the circumferential windings at all points.

For splicing circumferential windings 33, the clamp shown in Figs. 21 and 22 may be used. This clamp comprises a block 115 and cap 116, secured together by clamping screws 117. The clamp is concave longitudinally on its inner face to correspond to the curvature of the body wall 30, and the sides and ends of the blocks 115 are chamfered or beveled on the lower side to support the body wall 30 closely adjacent the wires 33, as previously described.

The clamping devices shown in Figs. 18 to 22 inclusive are all very small and are preferably made of a light metal to reduce weight, this being also true of the supporting rings and all other rigid parts of the tank construction.

If the walls of the tank or pressure-resisting structure are made of very thin foil, there is a tendency for the foil to break or tear at any unsupported point, even if of very small area. In Fig. 23 the normal position of the thin foil is indicated at 120, the foil being supported by relatively close windings 121. It will be seen, however, that a substantial triangular space 122 is left between each two adjacent windings, into which space the thin foil may be forced to the abnormal position 120ª, in which event tearing or breakage will quite probably occur.

In order to prevent this result, I provide a supplemental winding 124 (Fig. 24) formed of wire substantially triangular in cross section and adapted to substantially fill the spaces 122 previously described. The thin foil 120 will then be effectively supported at all points and the tearing or breaking previously referred to will be avoided, particularly if the close windings 121 are reenforced by windings 125 overlying and transverse thereto. The supplementary wires 124 may be held in position between the windings 121 by a suitable flexible cement, if so desired.

In some cases, resistance to heavy pressures requires the longitudinal windings to be placed quite closely together and the supporting screws and rings must be relatively small, while the load on the screws and rings is substantially increased.

To avoid these objections and to permit the use of larger screws and rings with close spacing of wires, I preferably provide a plurality of screws 126 (Figs. 25 and 26), one for each loop 127, these screws being placed in alignment transversely of the supporting ring or plate 128. In this way, the load on each screw is reduced and larger screws 126 and rings 129 can be used, permitting the strain on different wires to be more easily equalized.

A similar arrangement is shown in Fig. 27 in which, however, the screws 130, 131 and 132 and corresponding rings are of progressively larger diameters, so that the different loops are definitely spaced apart and lay flat. With either of these arrangements, close spacing of longitudinal wires is made possible.

In Fig. 28 I have shown a modified construction in which the body 140 and conical end 141 may be made continuous and the longitudinal wires 142 may also be made continuous, so that they may be anchored at their ends to the end discs of the tank. To attain this result, a ring 144 is substituted for the structure shown in Fig. 11, said ring 144 being placed outside of the thin sheet material forming the body 140 and end 141, and preferably having a steel ring or bearing plate 145 at the corner thereof, on which are mounted grooved rollers 146, one for each longitudinal wire 142.

The bearing plate 145 is conical and makes equal angles with the cylindrical body wall 140 and the conical end wall 141. The rollers 146 are thus adapted to shift slightly in one direction or the other to equalize the tension on different portions of the wires 142. This construction permits a substantial saving in weight over that required for the more complicated structure shown in Fig. 11.

In cases where exceptional equalization of strain or tension on all longitudinal wires is desired, the construction shown in Fig. 29 may be substituted for the interlaced structure shown in Fig. 7. In Fig. 29 all of the circumferential windings 150 are placed first around the thin body wall 30, after which a continuous longitudinal wire 151 is laced back and forth around grooved rings 152 on screws 153. The grooves in the rings 152 support the wire 151 just out of contact with the circumferential wires 150, so that all portions of the wire 151 may move freely endwise to effectively equalize the tension or strain thereon.

If cross windings for torsional strain are required, a continuous cross wire 155 may be laced about grooved rings 156 on additional screws 157, the grooves in the rings 156 being high enough so that the cross wires just clear the looped portions of the longitudinal wire 151. The screws 153 and 157 (Fig. 29) are threaded in a relatively heavy ring or plate 160, corresponding to the ring 37 previously described, and an inner clamping ring or plate 161 may be secured by nuts 162 on the inner ends of the screws 153 and 157.

It is evident that many changes may be made in the construction disclosed without departing from the spirit and intent of my invention as herein described. Windings may be applied in various directions; any number of windings may be used; the various windings may be of different sizes of wire; and the wires may be of any desired cross section, such as round, flat or oval.

In all such variations, the advantages of this method of construction will hold, namely the production of very high, pressure-resisting, hollow structures, having walls of thin sheet metal or foil and with a very large part of the weight in the form of fine wire of extremely high tensile strength. I have found that a container made from aluminum foil with a thickness of 0.0035" when reenforced as herein described will easily withstand pressures of several hundred pounds per square inch. Similar pressures will be withstood by foil as thin as 0.0008" if wound with fine wires more closely spaced but not in contact.

With my improved arrangement of parts and manner of winding, anchoring and splicing the wires, this high tensile strength is utilized in very great degree and with substantially uniform stresses in all parts of the structure.

Having thus described my invention and the advantages thereof, I do not wish to be limited to the details herein disclosed, otherwise than as set forth in the claims, but what I claim is:—

1. A light hollow member strongly resistant to internal pressure comprising a container of thin sheet metal and an external reenforcing winding of fine wires of high tensile strength, some of said wires extending longitudinally and others circumferentially of said container, and additional wires extending at substantial angles to said longitudinal wires to resist torsion on said container.

2. A light hollow member strongly resistant to internal pressure comprising a container of thin sheet metal having body and end portions, an external reenforcing winding of fine wires of high tensile strength for said container, some of said wires extending longitudinally and others circumferentially of said container, supporting rings between said body and end portions, and spaced grooved guide rings rotatably mounted on said supporting rings and about which said longitudinal wires are looped.

3. A light hollow member strongly resistant to internal pressure comprising a container of thin sheet metal having body and end portions, an external reenforcing winding of fine wires of high tensile strength for said container, some of said wires extending longitudinally and others circumferentially of said container, supporting rings between said body and end portions, and spaced grooved guide rings rotatably mounted in transverse series on said supporting rings and about which said longitudinal wires are looped.

4. The combination in a light hollow member as set forth in claim 3, in which the guide rings in each series are progressively of greater diameter toward the adjacent end of said container.

5. A light hollow member strongly resistant to internal pressure comprising a container of thin sheet metal having a body portion and axially-extended end portions, supporting rings positioned between said body and end portions, means to secure said body and end portions to said supporting rings, and an external reenforcing winding of fine wire of high tensile strength encompassing said container and engaging said rings.

6. A light hollow member strongly resistant to internal pressure comprising a container of thin sheet metal having a body portion and axially-extended end portions, supporting rings positioned between said body and end portions, means to secure said body and end portions to said supporting rings, rigid end members for said end portions, and an external reenforcing winding of fine wire of high tensile strength encompassing said container, longitudinal wires of said winding being looped between spaced supporting rings and additional longitudinal wires being looped between a supporting ring and an adjacent rigid end member.

7. A light hollow member strongly resistant to internal pressure comprising a container of thin sheet metal having a body portion and axially-extended end portions, supporting rings positioned between said body and end portions, means to secure said body and end portions to said supporting rings, rigid end members for said end portions, intermediate conical rings between said supporting rings and said end members, and an external reenforcing winding of fine wires of high tensile strength encompassing said container, certain longitudinal wires of said winding being looped between spaced supporting rings, additional longitudinal wires being looped between a supporting ring and an adjacent intermediate ring, and other wires being looped between an intermediate ring and an adjacent rigid end member.

8. The combination in a light hollow member as set forth in claim 7, in which the intermediate rings are substantially frustro-conical in cross section, and in which the inner corners of said rings are rounded and their outer edges are outwardly beveled to support the thin sheet metal of the associated end portion closely adjacent the longitudinal wires of the encompassing winding.

9. The combination in a light hollow member as set forth in claim 7, in which the wires are secured to said intermediate rings by screws threaded in holes which extend part way only through said rings.

10. A light hollow member strongly resistant to internal pressure comprising a container of thin sheet metal having a body portion and axially-extended end portions, supporting rings positioned between said body and end portions, means to secure said body and end portions to said supporting rings, an external reenforcing winding of fine wire of high tensile strength encompassing said container and including circumferential wires on said end portions, and means to hold said circumferential wires in spaced relation.

11. A light hollow member strongly resistant to internal pressure comprising a container of thin sheet metal having a body portion and axially-extended end portions, supporting rings positioned between said body and end portions, means to secure said body and end portions to said supporting rings, an external reenforcing winding of fine wire of high tensile strength encompassing said container and including circumferential wires on said end portions, and means to hold said circumferential wires in spaced relation, said latter means comprising longitudinally and inwardly extending bars secured at one end to a supporting ring and notched to receive said wires.

12. The combination in a light hollow member as set forth in claim 11, in which said bars are substantially flat but have the longitudinal edge portions thereof beveled inwardly from both sides.

13. A light hollow member strongly resistant to internal pressure comprising a container of thin sheet metal and an external reenforcing winding of fine wires of high tensile strength, some of said wires extending longitudinally and others circumferentially of said container, said container having a body portion and end portions and supporting rings between said body and end portions, and means to clamp the thin sheet metal edges of the adjacent parts of said body and end portions to said supporting rings.

14. A light hollow member strongly resistant to internal pressure comprising a container of thin sheet metal and an external reenforcing winding of fine wires of high tensile strength, some of said wires extending longitudinally and others circumferentially of said container, said container having a body portion and end portions and supporting rings between said body and end portions, and means to clamp the thin sheet metal edges of the adjacent parts of said body and end portions to said supporting rings, the edge portions of said supporting rings being outwardly beveled so as to support the thin sheet material at points closely adjacent the longitudinal reenforcing wires.

15. A light hollow member strongly resistant to internal pressure comprising a container of thin sheet metal and an external reenforcing winding of fine wires of high tensile strength, some of said wires extending longitudinally and others circumferentially of said container, said container having a body portion and end portions and supporting rings between said body and end portions, and means to clamp the thin sheet metal edges of the adjacent parts of said body and end portions to said supporting rings, one edge portion of each supporting ring being outwardly beveled and the other edge portion being outwardly offset and outwardly beveled so as to support the thin sheet material at points closely adjacent the longitudinal reenforcing wires.

16. A light hollow member strongly resistant to internal pressure comprising a container of thin sheet metal and an external reenforcing winding of fine wires of high tensile strength, some of said wires extending longitudinally and others circumferentially of said container, said container having a body portion and end portions and supporting rings between said body and end portions, and means to clamp the thin sheet metal edges of the adjacent parts of said body and end portions to said supporting rings, said clamping means comprising an inner ring for each supporting ring, and relatively narrow packing rings between the edge portions of said inner ring and the sheet material to be secured.

17. The combination in a light hollow member as set forth in claim 16, in which the edge portions of said sheet material are wrapped around said packing rings.

18. A light hollow member strongly resistant to internal pressure comprising a container of thin sheet metal and an external reenforcing winding of fine wires of high tensile strength, said container having a body portion and axially extended conical end portions, and means to secure said body and end portions together comprising a cylindrical supporting ring for the edge of the body portion, a conical supporting ring for the edge of the adjacent conical end portion, an inner clamping ring having cylindrical and conical portions, packing rings between said inner ring and said cylindrical and conical supporting rings, and means to clamp said rings together and to press said packing rings and said supporting rings against opposite faces of said body and end portions.

19. Means to secure an internal thin sheet metal partition in a thin sheet metal container comprising a cylindrical supporting ring, an inner ring having cylindrical and conical portions, means to clamp an intermediate portion of the cylindrical wall of said container between said cylindrical portion and said supporting ring, a conical clamping ring, and means to clamp the edge of the internal partition between the inner face of the conical portion of said inner ring and the outer face of said conical clamping ring.

20. In a light hollow member strongly resistant to internal pressure, a body having a thin sheet metal cylindrical wall, a reenforcing circumferential winding of closely adjacent round wires, and a supporting winding of wire of substantially triangular cross section positioned between adjacent turns of said circumferential winding and engaging and supporting the outer surface of said cylindrical wall.

21. A light hollow member strongly resistant to internal pressure comprising a container of thin sheet metal, an external reenforcing winding of longitudinal and circumferential wires, a supporting ring for said thin sheet metal, a clamping plate on said ring by which ends of said wires may be secured to said ring, and a guide device on said ring to change the direction of approach of a longitudinal wire to said clamping plate.

22. A light hollow member strongly resistant to internal pressure comprising a container of thin sheet metal having a substantially cylindrical body portion and conical end portions continuous therewith, bearing rings at each end of said body portion, said rings being triangular in cross section with a conical inner surface engaging said sheet metal container and with cylindrical and more sharply conical external surfaces, and said hollow member having longitudinally disposed reenforcing wires overlying and supported by said bearing ring.

23. The combination in a light hollow member as set forth in claim 22, in which anti-friction supports are provided for said wires on said bearing ring.

24. The combination in a light hollow member as set forth in claim 22, in which a bearing plate is provided on said ring which makes equal angles with said external cylindrical and external conical surfaces, and in which grooved rolls are provided on said bearing plate to guide and support said longitudinal wires.

25. A light hollow member strongly resistant to internal pressure comprising a container of thin sheet metal, a series of circumferential windings of fine wire encircling said container, a longitudinal winding formed in a series of loops, and means to support said loops outside of said circumferential windings and closely adjacent thereto but normally out of contact therewith.

26. A light hollow member strongly resistant to internal pressure comprising a container of thin sheet metal, a series of circumferential windings of fine wire encircling said container, a longitudinal winding formed in a series of loops, means to support said loops outside of said circumferential windings and closely adjacent thereto but normally out of contact therewith, a cross winding to resist torsional strain on said container and having loops formed of diagonally disposed wires, and means to support said cross winding outside of but closely adjacent to said longitudinal windings.

ROBERT H. GODDARD.